(12) United States Patent
Lin et al.

(10) Patent No.: US 7,117,058 B2
(45) Date of Patent: Oct. 3, 2006

(54) AUTOMATIC STATISTICAL PROCESS CONTROL (SPC) CHART GENERATION APPARATUS AND METHOD THEREOF

(75) Inventors: Mu-Tsang Lin, Changhua (TW); Tien-Wen Wang, Hsinchu (TW); Joseph W. L. Fang, Hsinchu (TW); Ie-Fun Lai, Yonghe (TW); Chon-Hwa Chu, Taoyuan Hsien (TW); Jian-Hong Chen, Hsinchu (TW); Chin-Chih Chen, Hsinchu (TW); Yu-Yi Wu, Yongkang (TW); Yao-Wen Wu, Tainan (TW); Wen-Sheng Chien, Miaoli Hsien (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 161 days.

(21) Appl. No.: 10/875,331

(22) Filed: Jun. 24, 2004

(65) Prior Publication Data

US 2005/0288810 A1   Dec. 29, 2005

(51) Int. Cl.
*G06F 19/00* (2006.01)

(52) U.S. Cl. .................. 700/108; 700/51; 700/110; 700/121; 702/182

(58) Field of Classification Search ............... 700/51, 700/100, 108, 110, 121; 702/84, 182, 183; 438/5, 14
See application file for complete search history.

(56) References Cited

U.S. PATENT DOCUMENTS

| | | | |
|---|---|---|---|
| 6,646,660 B1 * | 11/2003 | Patty | 700/108 |
| 6,727,106 B1 * | 4/2004 | Ankutse et al. | 438/5 |
| 6,970,758 B1 * | 11/2005 | Shi et al. | 700/108 |
| 2005/0015176 A1 * | 1/2005 | Harada et al. | 700/121 |
| 2005/0021534 A1 * | 1/2005 | Cheng et al. | 707/100 |
| 2005/0038543 A1 * | 2/2005 | Lin et al. | 700/108 |

* cited by examiner

*Primary Examiner*—Leo Picard
*Assistant Examiner*—Alexander Kosowski
(74) *Attorney, Agent, or Firm*—Thomas, Kayden, Horstemeyer & Risley

(57) ABSTRACT

A system and method for automatic SPC chart generation including a storage device and a data acquisition module. The storage device stores a chamber management tree, a recipe window management tree, a parameter configuration table and multiple chart profile records. The data acquisition module, which resides in a memory, acquires multiple process events and parameter values corresponding to the process events and a process parameter, selects a relevant statistical algorithm, calculates a statistical value by applying the statistical algorithm to the parameter values, creates a new chart profile record and a parameter statistics record therein if the chart profile record is absent, and stores the statistical values and measured time in the parameter statistics record.

24 Claims, 9 Drawing Sheets

| Parameter ID 51 | Selector 52 | Parameter Name 53 | SVID 54 | Mean 55 | Group 56 | Range 57 | Group 58 |
|---|---|---|---|---|---|---|---|
| 1 | ✓ | Gas | 7711 | 2 % | G-B | 3 % | G-B |
| 2 | ✓ | TCP forward | 7712 | 0.5 % | G-B | 1 % | G-B |
| 3 | ✓ | TCP reflected | 7713 | 4 W | G-B | ? | G-B |
| 4 | ✓ | Bias forward | 7714 | 10 % | G-B | 1.5 % | G-B |
| 5 | | Bias reflected | 7715 | | | | |
| 6 | ✓ | Pressure | 7716 | 0.5 % | G-B | 5 % | G-B |

AUTOMATIC STATISTICAL PROCESS CONTROL (SPC) CHART GENERATION APPARATUS AND METHOD THEREOF

BACKGROUND

The present invention relates to computer systems, and more particularly, to a method and apparatus of automatic statistical process control (SPC) chart generation.

Integrated circuits are typically fabricated by processing one or more wafers as a "lot" with a series of wafer fabrication tools (i.e., "processing tools"). Each processing tool typically performs a single wafer fabrication task on the wafers in given lot. For example, a particular processing tool may perform layering, patterning and doping operations or thermal treatment. A layering operation typically adds a layer of a desired material to an exposed wafer surface. A patterning operation typically removes selected portions of one or more layers formed by layering. A doping operation typically incorporates dopants directly into the silicon through the wafer surface, to produce p-n junctions. A thermal treatment typically heats a wafer to achieve specific results (e.g., dopant drive-in or annealing).

Each processing tool typically performs a wafer fabrication task according to a predefined procedure (i.e., a predetermined set of steps or "recipe"). For example, a particular chemical vapor deposition (CVD) processing tool may perform a layering operation within a chamber according to a recipe which specifies temperatures and pressures within the chamber as a function of time, as well as the type and flow rate of gas introduced thereto.

A fault detection and classification (FDC) system directly monitors process parameters in order to detect conditions that may cause aberrations as they occur. Examples of process parameters are temperature, pressure, power and flow rates of process materials. A process parameter may be assigned to a processing tool to effectuate an outcome such as metal deposition, oxide growth, source/drain implantation.

FDC systems collect and analyze process parameter data abnormalities, or faults, during operation of the processing tool. An example of a process fault is a significant drop in temperature from the temperature required to perform the particular process operation, e.g., thermal oxidation. Another example of a fault is a spike in a flow rate of a process material, such as helium. If a fault is detected, the system may have various means of reacting, such as notifying a tool operator or halting the process. SPC chart is a common technique for tracking and analyzing manufacturing process variations. SPC has been applied to gauge the stability of a manufacturing process over time via charted SPC data (i.e., SPC charts) which document historical process performance.

When SPC data regarding one or more wafers processed through a given processing tool indicates a characteristic of the wafers affected by the processing tool has departed from an acceptable range established for the characteristic, an alarm is triggered, and the process is halted. In such a situation, a troubleshooting procedure is initiated, to determine and rectify the cause of the alarm and return the processing tool to service as quickly as possible.

Conventionally, SPC charts are processed manually, requiring an operator to produce ten thousands of SPC chart profiles containing requisite processing information, such as tool name, parameter name, chamber name, and/or others. The labor-intensive nature of SPC chart generation using conventional means severely hinders efficiency. Additionally, it is difficult to generate sufficient SPC chart frames by relying on manual effort alone to satisfy the requirement of full process monitoring.

In view of these limitations, a need exists for an apparatus and method of automatic SPC chart generation, thereby achieving the goal of full process monitoring.

SUMMARY

It is therefore an object of the present invention to provide an apparatus and method thereof for automatic SPC chart generation capable of generating sufficient SPC chart frames.

According to the embodiment of the invention, the apparatus includes a central processing unit (CPU), a communication device, a display device, an input device, a memory and a storage device. The communication device is configured to receive process event signals and process parameter signals from sensors. The communication device acquires the process parameter signals on a periodic or a real time basis for statistical analysis. The CPU, directed by instructions received from the memory and from an operator through the input device, performs several automatic SPC chart generation functions.

The storage device stores a chamber management tree, a recipe window management tree, a parameter configuration table, multiple chart profile records and parameter statistics record. The chamber management tree describes the relationship of tool types, processing tools, chamber types and tool chambers. The recipe window management tree describes the relationship of tool types, recipes, steps and sampling windows. The parameter configuration table describes the relationship of tool types, parameters, statistical groups, statistical algorithms and acceptable ranges. The chart profile record and parameter statistics record employs a master-detail relationship. The chart profile record is capable of storing requisite process information, such as tool ID, statistical algorithm, parameter SVID or others. The parameter statistics record is capable of storing calculation information, such as statistical values, time or others.

The memory preferably includes a configuration module, a data acquisition module and an SPC chart display module, which includes instructions on performing automatic SPC chart generation functions.

The configuration module provides a graphical user interface (GUI), enabling easy maintenance of the chamber management tree, recipe window management tree and parameter configuration table tasks, such as adding a new node to a tree, deleting a node from a tree, modifying a value in a table or and the like can be accomplished through the configuration module.

The data acquisition module acquires process events including notification of a new process recipe, starting to process a new lot of wafers, starting to process a new wafer, ending processing a wafer, and an alarm. Subsequent to starting a process, the data acquisition module periodically acquires parameter values by data sampling. After receiving parameter values with requisite process information, such as tool, chamber, recipe and others, the data acquisition module acquires a relevant statistical group and a statistical algorithm according to parameter values, the chamber management tree, recipe window management tree and parameter configuration table. A statistical value is calculated by applying the statistical algorithm to parameter data samples. The data acquisition module determines whether a corresponding chart profile record exists, and if so, creates a new parameter statistics record linked to the chart profile record, and inserts the statistical value and measured time therein. Otherwise, creates a new chart profile record and a new chart statistical record thereof, and inserts the statistical value and measured time therein.

The SPC chart display module provides a GUI to display the statistical values and graphics according to the chart profile record and parameter statistics records thereof once a specific SPC chart is selected.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 5 is a diagram of an exemplary parameter configuration table according to the present invention;

DESCRIPTION

Figure 1:
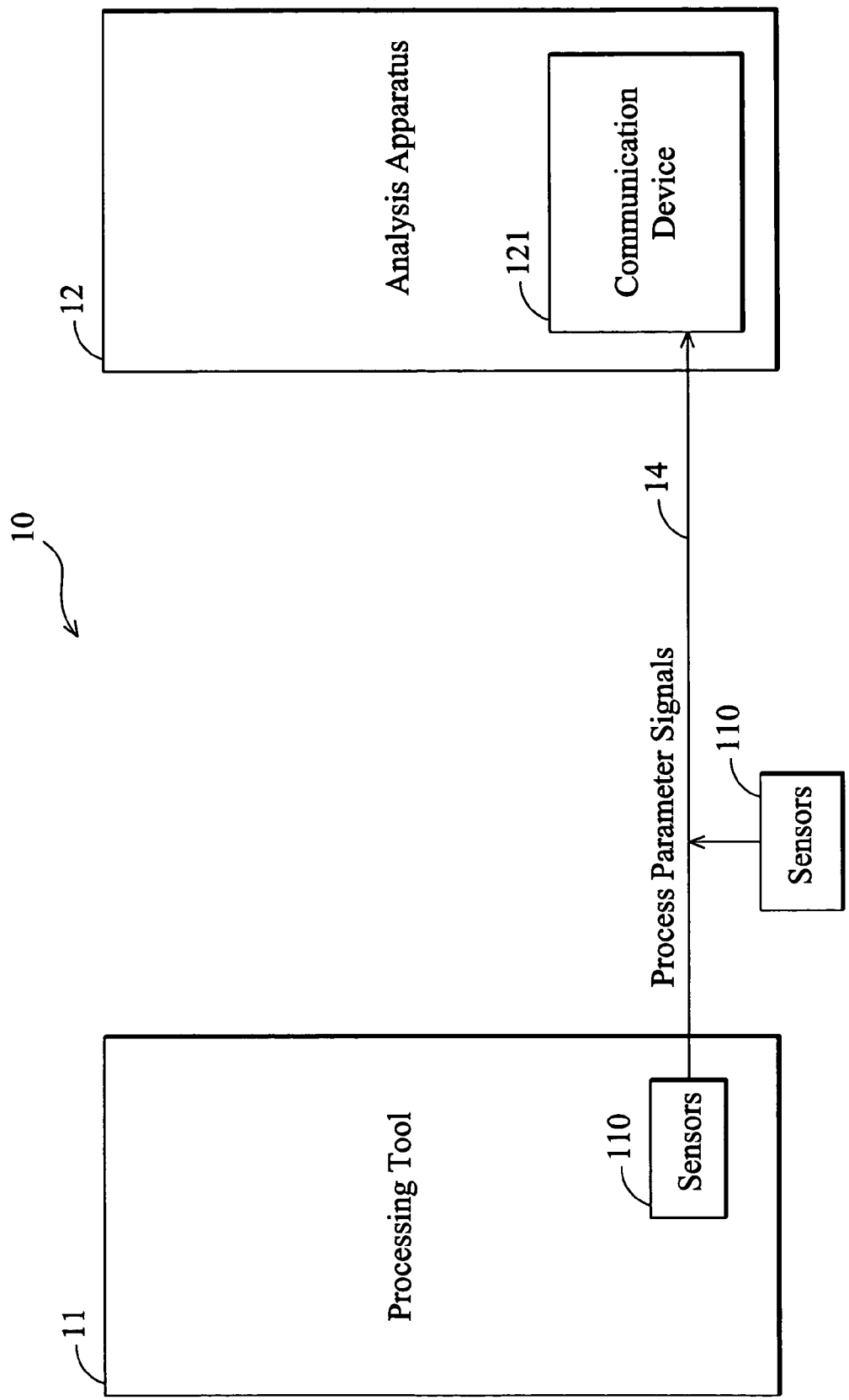
FIG. 1 is a diagram of the architecture of a system for automatic statistical process control (SPC) chart generation according to the present invention.

FIG. 1 is a diagram of the architecture of a system for automatic statistical process control (SPC) chart generation according to the present invention. The system 10 includes a processing tool 11 and an analysis apparatus 12.

The analysis apparatus 12 contains a communication device 121. The communication device 121 is configured to receive process event signals (not shown) and process parameter signals 14 from sensors 110. The sensors 110 are placed inside or outside the processing tool 11. The sensors 110 measure process parameters of a wafer fabrication process performed by the processing tool 11. As defined herein, process parameters include temperature, pressure, flow rate, power or others, any of which can be used to configure a processing tool. The communication device 121 acquires the process parameter signals 14 on a periodic or a real time basis for statistical calculation. It is noted that the process parameter signals 14 are acquired by the communication device 121 independent of the processing tool 11. In other words, the analysis apparatus 12 is advantageously not dependent upon the processing tool 11 to provide the desired process parameters.

Figure 2:
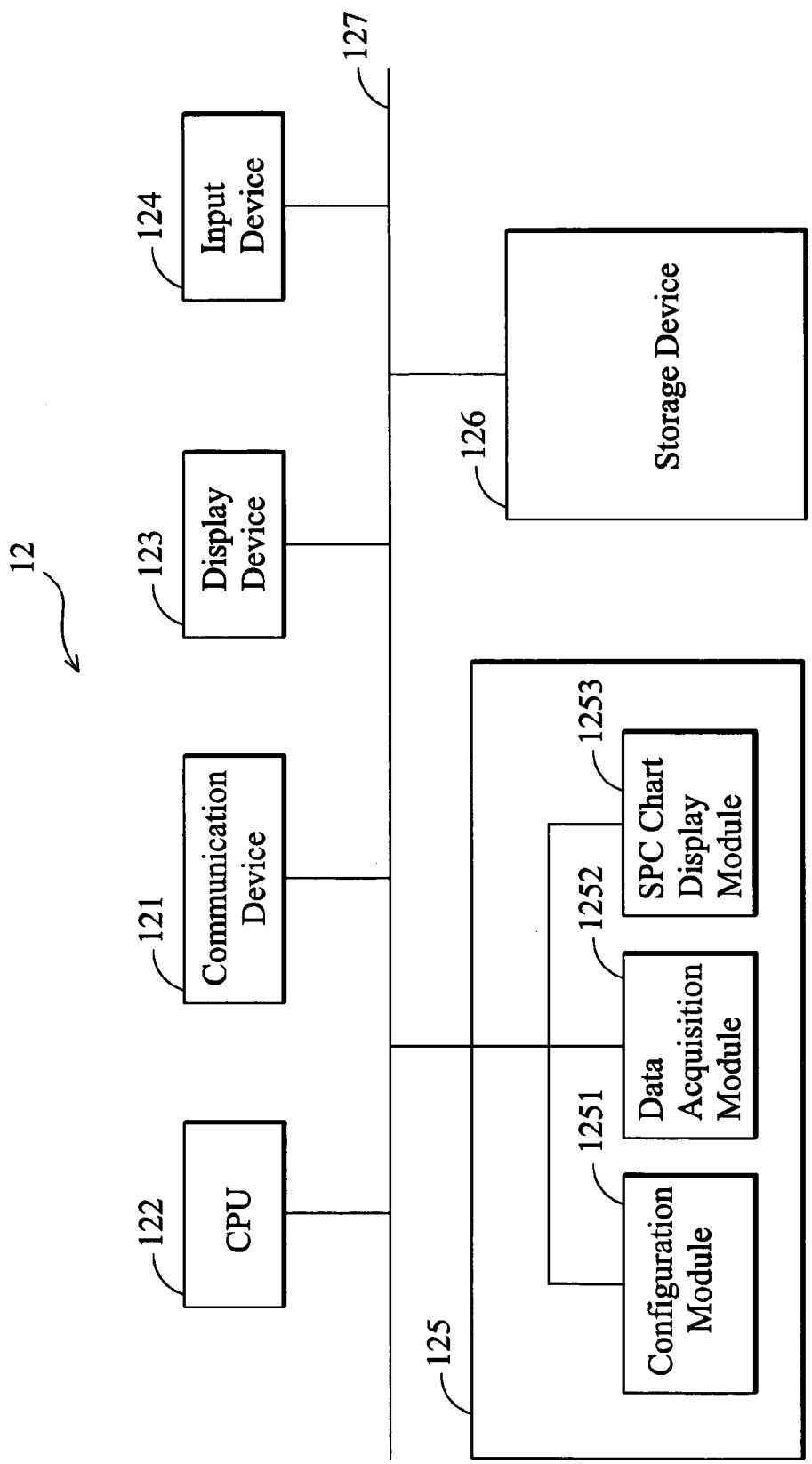
FIG. 2 is a diagram of the architecture of an analysis apparatus according to the present invention.

FIG. 2 is a diagram of the architecture of an analysis apparatus according to the present invention. The analysis apparatus 12 includes a central processing unit (CPU) 122, a communication device 121, a display device 123, an input device 124, a memory 125 and a storage device 126. The CPU 122 is connected by buses 127 to the memory 125, the communication device 121, the display device 123, the input device 124, and the storage device 126 based on Von Neumann architecture. The CPU 122, memory 125, storage device 126, display device 123, input device 124 and communication device 121 may be conventionally incorporated in a mainframe computer, a mini-computer, a workstation computer or a personal computer.

The CPU 122, controlled by instructions received from the memory 125 and from an operator through the input device 124, performs several automatic SPC charts generation functions.

The storage device 131 can be implemented as a database system, a file system or the like, to store a chamber management tree, a recipe window management tree, a parameter configuration table, multiple chart profile records and parameter statistics records.

Figure 3:
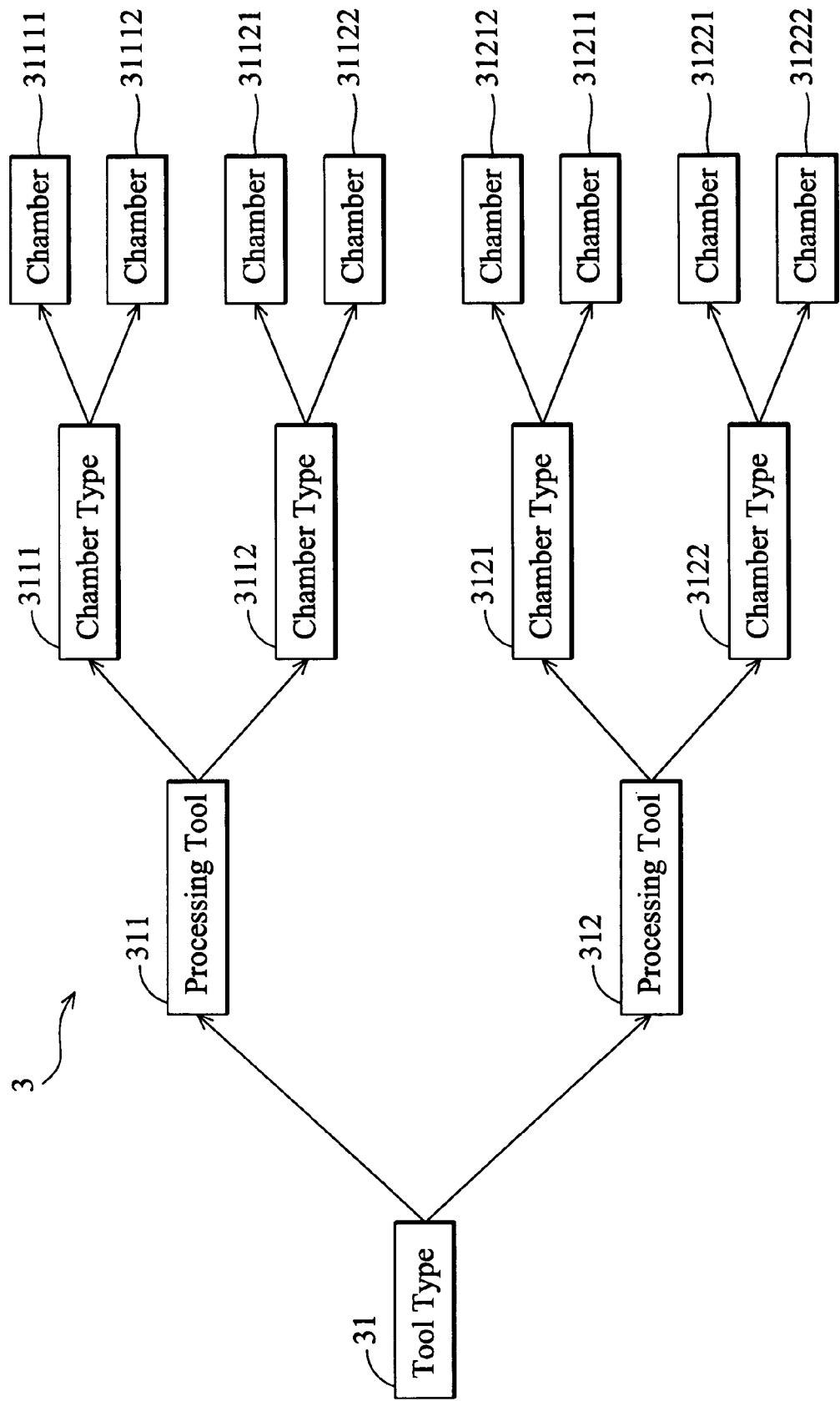
FIG. 3 is a diagram of an exemplary chamber management tree according to the present invention.

FIG. 3 is a diagram of an exemplary chamber management tree according to the present invention. The chamber management tree defines the relationship of at least two of tool types, processing tool, chamber types and tool chamber. Multiple processing tools are grouped into a tool type, and each processing tool has multiple chamber types that individually contain multiple tool chambers. Consistent with the scope and spirit of the invention, additional or different nodes may be provided. According to the example, the chamber management tree 31 includes a tool type 31 named "TEL Track" as a root, which contains two processing tools 311 and 312 named "NED7B1" and "NED7B2" respectively. Each processing tool corresponding to the tool type 31 includes two chamber types, "CPL" 3111 and "PHP" 3112, and each chamber type includes two tool chambers.

Figure 4:
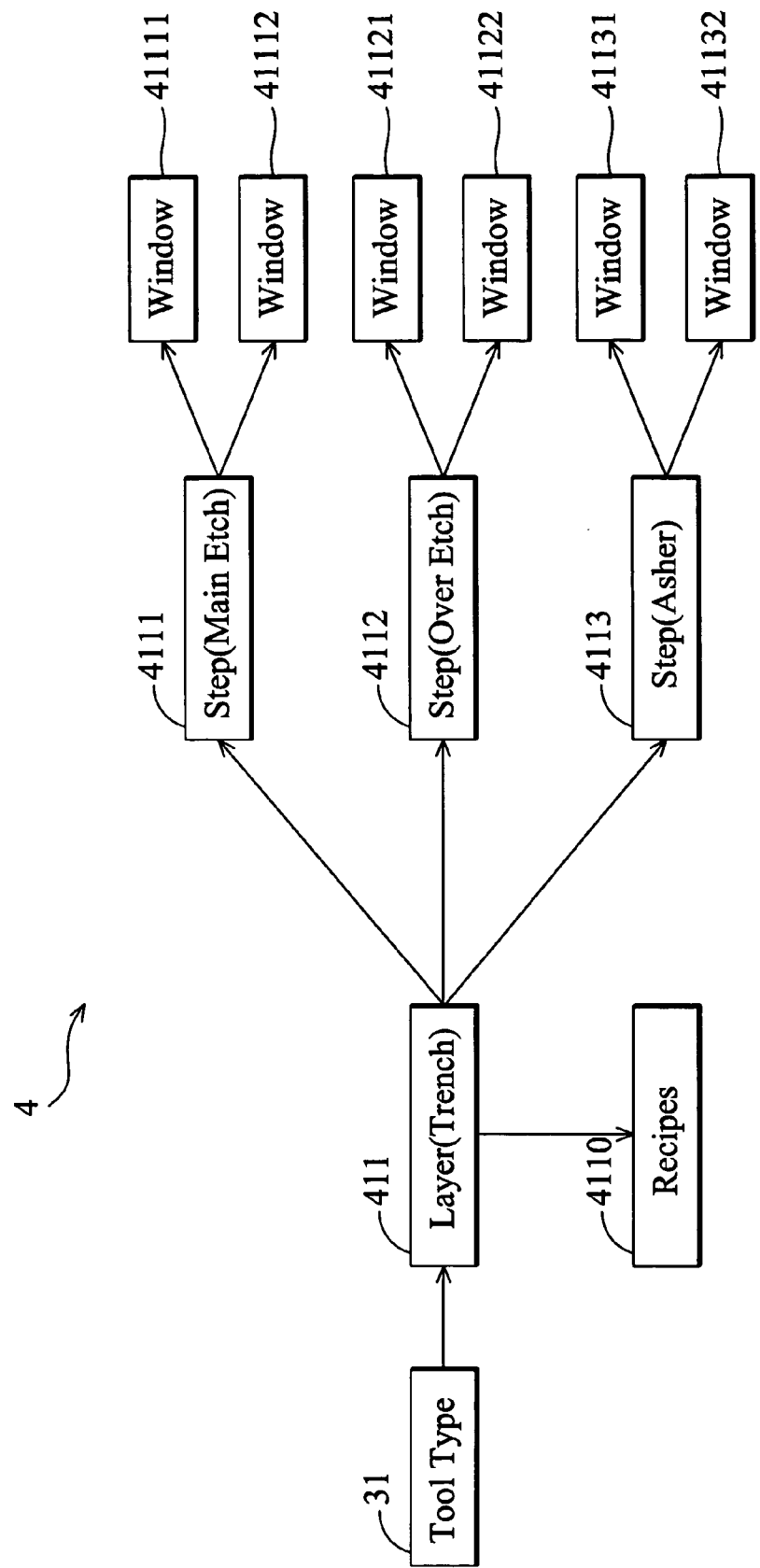
FIG. 4 is a diagram of an exemplary recipe window management tree according to the present invention.

FIG. 4 is a diagram of an exemplary recipe window management tree according to the present invention. The recipe window management tree defines the relationship of at least two of recipes, steps and sampling windows. Consistent with the scope and spirit of the invention, additional or different nodes may be provided. According to the example, a processing tool corresponding to the tool type 31 performs a trench operation. The layer 411 utilizes the processing recipes 4110, and includes three steps 4111, 4112, 4113 named "main etch", "over etch" and "asher" respectively. The main etch step 4111 has two windows, and each window defines a time scale utilized to depict a SPC chart, such as "from the beginning to t second", "from t second to the end" or others, where t is configured by an operator.

FIG. 5 is a diagram of an exemplary parameter configuration table according to the present invention. The parameter configuration table defines the relationship of at least two of tool types, process parameters, statistical groups, statistical algorithms and acceptable range. According to the example, the parameter configuration table 5 stores multiple parameter setting records for a particular tool type, and preferably contains eight fields, the parameter identity 51, selector 52, parameter name 53, status variable identification (SVID) 54, mean value 55, mean statistical group 56, range value 57 and range statistical group 58. Consistent with the scope and spirit of the invention, additional or different fields may be provided. According to the example, the tool type contains six parameter setting records ranging from 591 to 596. The parameter setting records with the exception of record 595, marked with "V" in the selector field 52 represent the corresponding outcome of a parameter calculated by two statistical algorithms, mean statistic and range statistic. The upper limit and lower limit of a SPC chart are generated by setting the mean value 55 and range value 57, thereby enabling the system 12 to implement a predefined out of control action plan (OCAP), such as sending an alarm e-mail to corresponding operators, when an out of range statistical value is detected. Each statistical algorithm of a specific parameter associates with a statistical group, such as "G-B", "G-R" or "G-CH", individually indicating whether the calculation is for an entire process, a processing recipe or a tool chamber.

Figure 6:
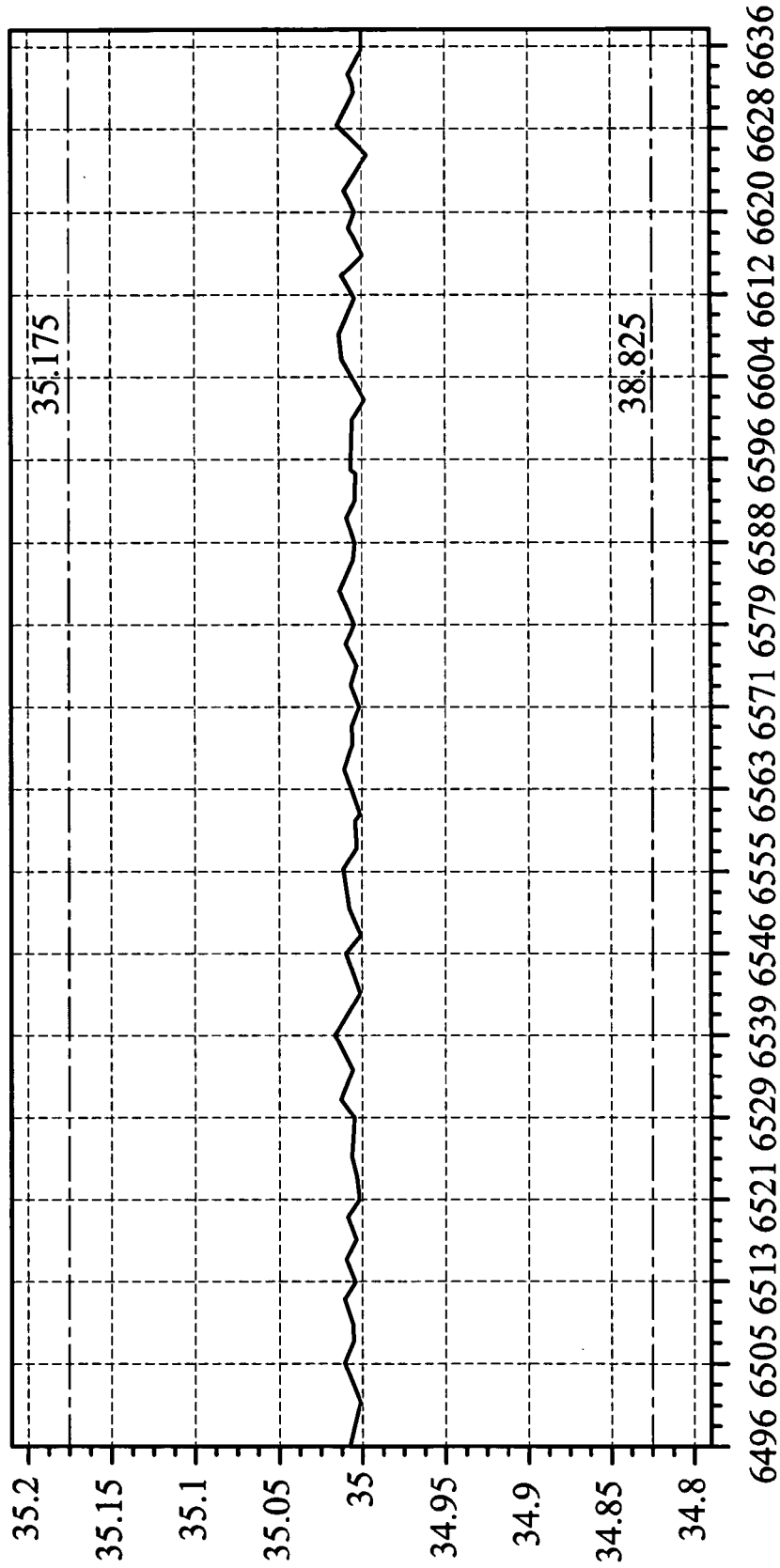
FIG. 6 is a diagram of an exemplary SPC chart according to the invention.

FIG. 6 is a diagram of an exemplary SPC chart according to the invention. According to the example, the two-dimensional (2D) SPC chart documenting mean statistics regarding the current pressure, of at least one semiconductor wafer processed by the particular processing tool "NEVIT6", versus time. The SPC chart shows the upper and lower limit of the acceptable range as 34.825 and 35.175. The SPC chart is drawn according to the chart profile record and multiple corresponding chart statistics records. The chart profile record and parameter statistics record employs a master-detail relationship. The chart profile record stores processing tool information, a parameter SVID, a statistical algorithm and a calculation time scale, corresponding to the chamber management tree, recipe window management tree and parameter configuration table. Additional information, including a chamber and a recipe or others, may be also included. The parameter statistics record stores historical performance, such as statistical values, measured time or others, associated with the processing tool, parameter SVID and statistical algorithm.

The memory 125 is preferably a random access memory (RAM), but may also include read-only memory (ROM) or flash ROM. The memory 125 preferably includes a configuration module 1251, a data acquisition module 1252 and a SPC chart display module 1253, including routines for performing automatic SPC chart generation functions.

The configuration module 1251 provides a graphical user interface (GUI), facilitating the manipulation of the chamber management tree 3, recipe window management tree 4 and parameter configuration table 5, such as inserting a new node into the tree, deleting a node from the tree, modifying a specific value in the table, or others. The GUI can additionally provide responses to information requests as required. The configuration module 1251 takes corresponding actions, such as sending a SQL command to a database system or modifying specific data in a file, corresponding to commands entered via the GUI.

The data acquisition module 1252 acquires process events include notification of a new process recipe, starting to process a new lot of wafers, starting to process a new wafer, ending processing a wafer, and an alarm. Subsequent to starting a processing tool, the data acquisition module 1252 periodically acquires the process parameter signals 14 (i.e., parameter values). After receiving a series of parameter values with requisite process information, such as tool, chamber, recipe and others, the data acquisition module 1252 acquires a relevant statistical group and a statistical algorithm according to the chamber management tree 3, recipe window management tree 4 and parameter configuration table 5. A statistical value is calculated by applying the statistical algorithm to the series of parameter values. The data acquisition module 1252 determines whether a corresponding chart profile record is present, and if so, creates a new parameter statistics record linked to the existing chart profile record, and stores the statistical value and measured time in the new parameter statistics record, otherwise, a new chart profile record and a new parameter statistics record linked to the new chart profile is created, and the statistical value and measured time are stored in the new parameter statistics record.

Figure 7:
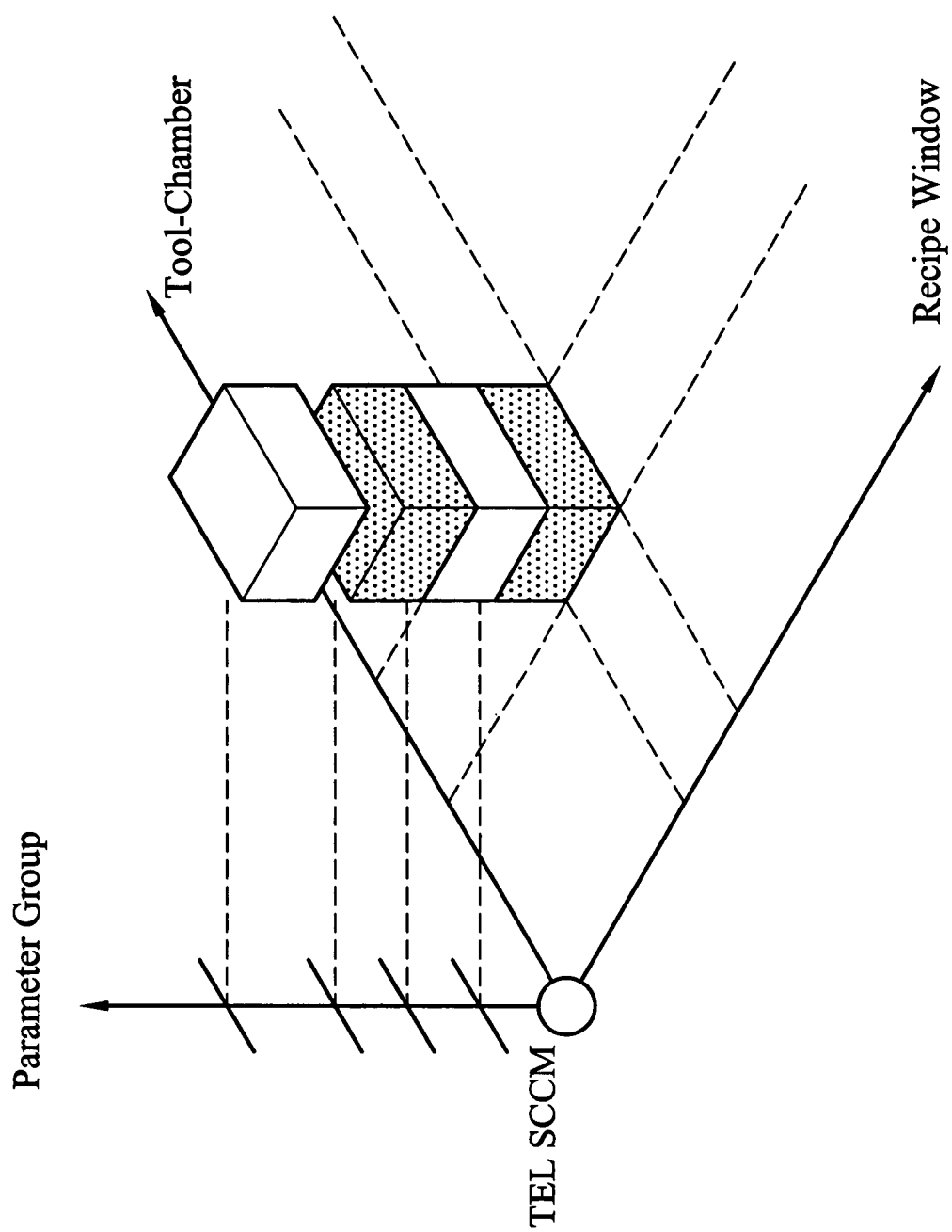
FIG. 7 is a diagram of SPC chart group according to the invention.

The SPC chart display module 1253 provides a GUI to display raw data and SPC charts according to a chart profile record and corresponding parameter statistics records. The GUI provides a tree view containing multiple SPC chart groups enabling an operator to browse and select for a specific SPC charts. FIG. 7 is a schematic diagram of a SPC chart group according to the invention. According to the example, SPC charts of the tool type, "TEL SCCM", are grouped according to the tool, chamber, parameter group, recipe and sampling window.

Figure 8:
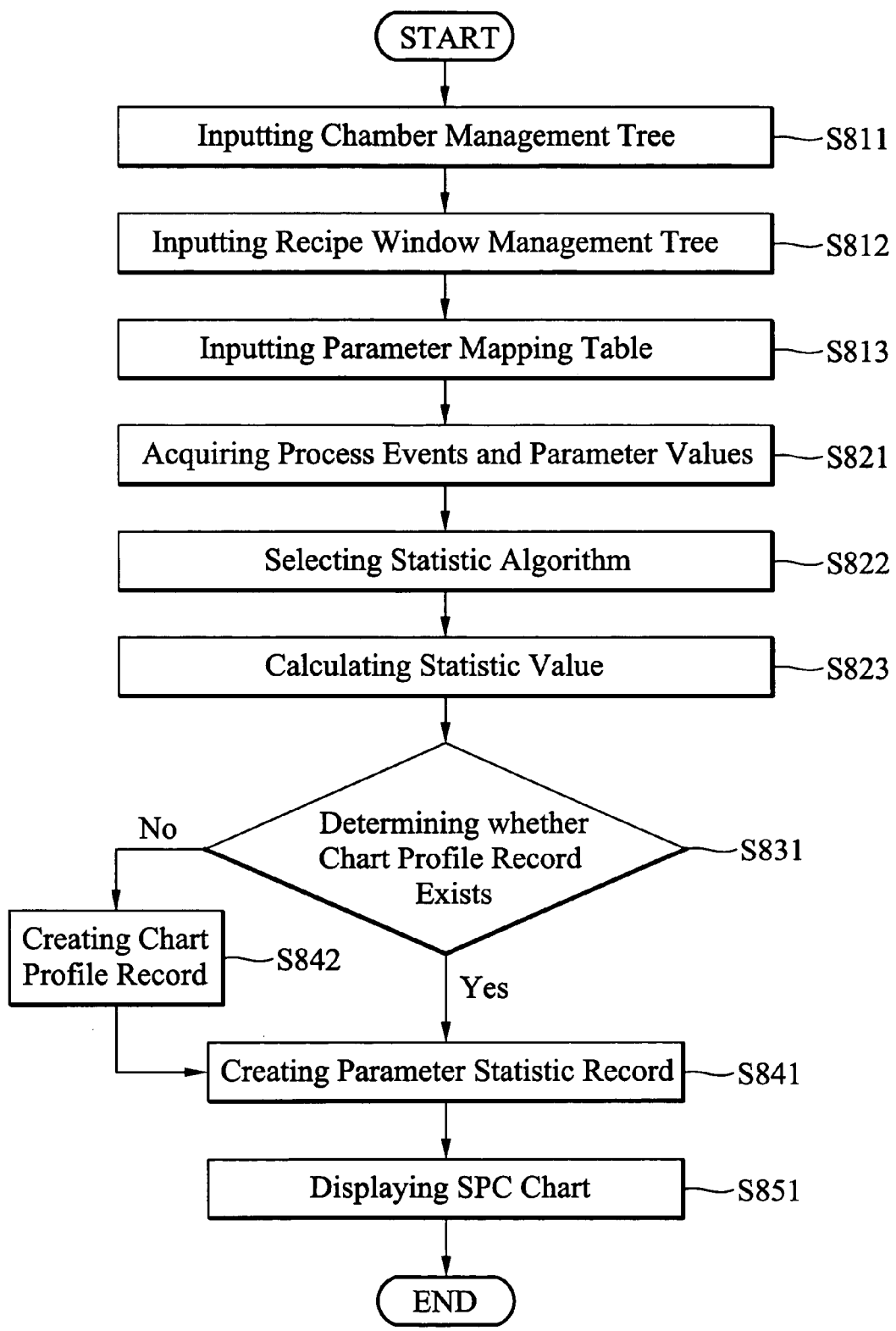
FIG. 8 is a flowchart illustrating the method of automatic SPC chart generation according to the present invention.

FIG. 8 is a flowchart showing the method of automatic SPC chart generation according to the present invention. The method begins in step S811 wherein the chamber management tree 3 is input. Referring to FIG. 3, the chamber management tree describes the relationship of tool types, processing tools, chamber types and tool chambers. In step S812 and S813, the recipe window management tree and parameter configuration table are input respectively. Referring to FIG. 4, the recipe window management tree describes the relationship of recipes, steps and sampling windows. In addition, referring to FIG. 5, the parameter configuration table describes the relationship of tool types, parameters, statistical groups, statistical algorithms and acceptable ranges.

Subsequent to input, the process proceeds to step S821 to acquire process events and parameter values. The process events include notification of a new process recipe, starting to process a new lot of wafers, starting to process a new wafer, ending a wafer process, and an alarm, transmitted from a processing tool. The parameter values are data samples of a specific parameter corresponding to the specific tool, chamber, recipe and/or others. In step S822, a statistical algorithm, such as a mean statistic, a variance statistic, or others, corresponding to the parameter values is selected according to parameter values, the chamber management tree 3, recipe window management tree 4 and parameter configuration table. In step S834, a statistical value is calculated by applying the statistical algorithm to the parameter values.

After the calculation is complete, the process proceeds to step S831 to determine whether a corresponding chart profile record is present. If so, the process proceeds to step S841 to create a new parameter statistics record linked to the chart profile record and stores the statistical values and measured time in the new parameter statistics record, and otherwise, proceeds to step S842 to create a new chart profile record, and subsequently to step S841 to create a new parameter statistics record linking to the new chart profile record and stores the statistical values and measured time in the new parameter statistic record.

Finally, in step S851, a SPC chart is drawn according to the chart profile record and corresponding parameter statistics records.

Figure 9:
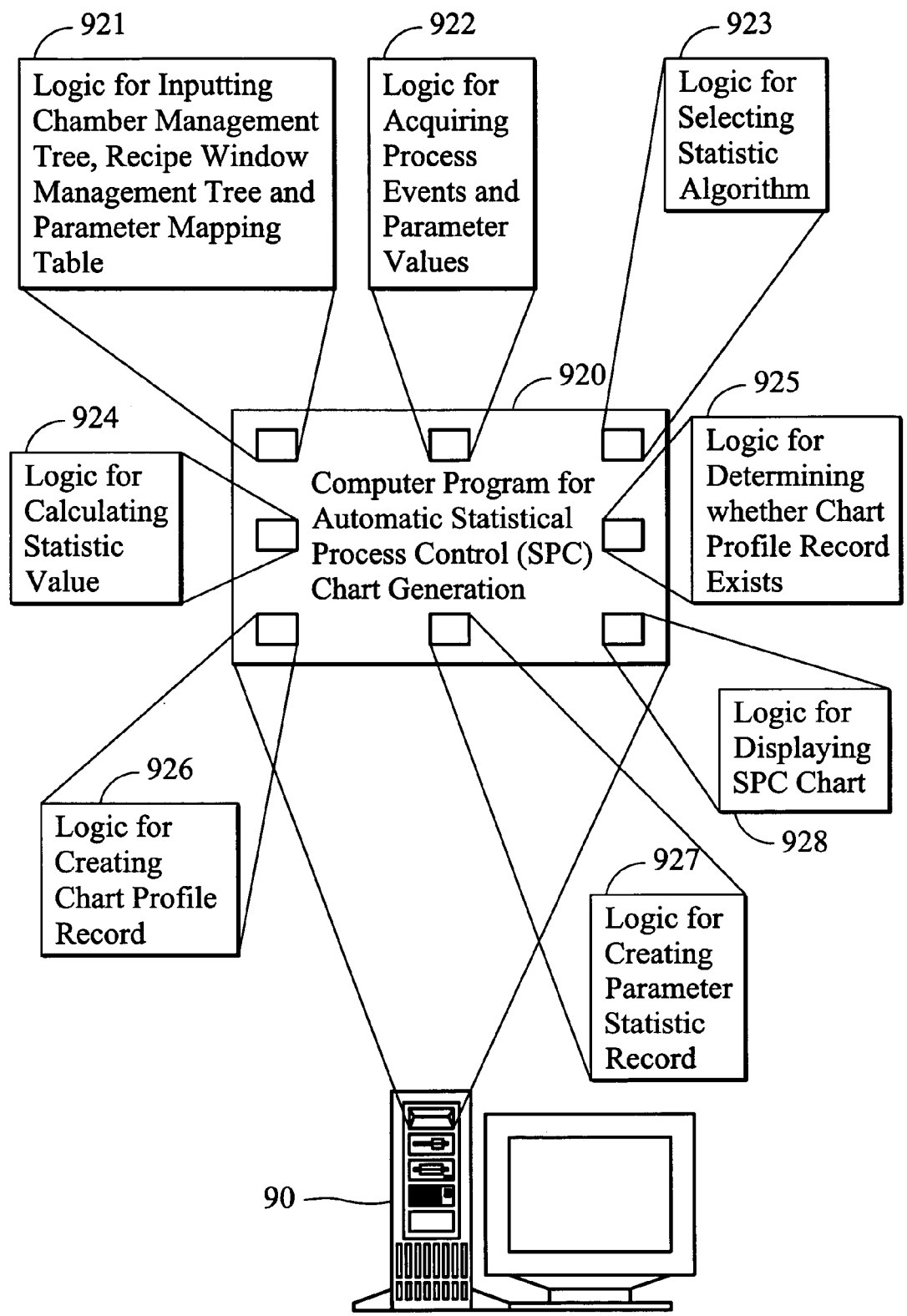
FIG. 9 is a diagram of a storage medium for storing a computer program providing the method of automatic SPC chart generation according to the invention.

The invention additionally discloses a storage medium for storing a computer program providing the disclosed method of automatic SPC chart generation, as shown in FIG. 9. The computer program product includes a storage medium 90 having computer readable program code embodied in the medium for use in a computer system, the computer readable program code comprising at least computer readable program code 921 for inputting a chamber management tree, a recipe window management tree and a parameter mapping table, computer readable program code 922 for acquiring process events and parameter values from a processing tool, computer readable program code 923 for selecting a statistical algorithm according to the chamber management tree, recipe window management tree and parameter mapping table, computer readable program code 924 for calculating a statistical value by applying the statistical algorithm to the parameter values, computer readable program code 925 for determining whether a corresponding chart profile record is present, computer readable program code 926 for creating a chart profile record corresponding to the parameter values, computer readable program code 927 for creating a parameter statistics record corresponding to the parameter values, and computer readable program code 928 for displaying a SPC chart via a GUI according to the chart profile record and parameter statistics record.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An apparatus of automatic statistical process control (SPC) chart generation, comprising:
    a storage device capable of storing a chamber management tree, a recipe window management tree, a parameter configuration table and a plurality of chart profile records, wherein the chamber management tree stores a relationship between at least two of tool type, processing tool and tool chamber, the recipe window management tree stores a relationship between at least two of tool type, recipe, and sampling window, and the parameter configuration table stores information indicating which statistical algorithms are applied in the entire process, recipe or tool chamber for each of a plurality of process parameters; and
    a data acquisition module, acquiring a plurality of process events and a plurality of parameter values corresponding to the process events and the process parameters, selecting the statistical algorithm for the parameter values according to the chamber management tree, the recipe window management tree and the parameter configuration table, calculating a statistical value by applying the statistical algorithm to the parameter values, creating a new chart profile record and a first parameter statistics record linked to the new chart profile record if the chart profile record corresponding to the process events and the process parameters is absent, and storing the statistical values in the first parameter statistic record.

2. The system of claim 1 wherein the data acquisition module, if the chart profile record corresponding to the process events and the process parameter is present, creates a second parameter statistics record linked to the chart profile record, and stores the statistical values in the second parameter statistics record.

3. The system of claim 1 further comprising a configuration module, modifying the chamber management tree, the recipe window management tree and the parameter configuration table.

4. The system of claim 3 wherein a first graphical user interface (GUI) within the configuration module, enables modification of the chamber management tree, the recipe window management tree and the parameter configuration table.

5. The system of claim 1 further comprising a SPC chart display module drawing the SPC chart according to the chart profile record and the parameter statistics record.

6. The system of claim 5 Wherein a second graphical user interface (GUI) within the SPC chart display module, enables selection of the SPC chart.

7. The system of claim 2 further comprising a SPC chart display module drawing the SPC chart according to the chart profile record and the parameter statistics record.

8. The system of claim 7 wherein a second graphical user interface (GUI) within the SPC chart display module, enables selection of the SPC chart.

9. A method of automatic statistical process control (SPC) chart generation, the method comprising using a computer to perform the steps of:
    acquiring a plurality of process events and a plurality of parameter values corresponding to the process events and a process parameter;
    selecting a statistical algorithm for the parameter values according to a chamber management tree, a recipe window management tree, a parameter configuration table, the process events and the process parameters, wherein the chamber management tree stores a relationship between at least two of tool type, processing tool and tool chamber, the recipe window management tree stores a relationship between at least two of tool type, recipe, and sampling window, and the parameter configuration table stores information indicating that the statistical algorithm is applied in the entire process, recipe or tool chamber for the process parameter;
    creating a new chart profile record and a first parameter statistic record linking to the new chart profile record if the chart profile record corresponding to the process events and the process parameter is absent; and
    storing the statistical values in the first parameter statistic record.

10. The method of claim 9 further comprising the steps of:
    creating a second parameter statistics record linked to the chart profile record if the chart profile record corresponding to the process events and the process parameter is present; and
    storing the statistic values in the second parameter statistics record.

11. The method of claim 9 further comprising a step of creating the chamber management tree, the recipe window management tree and the parameter configuration table.

12. The method of claim 11 wherein, in the step of creating the chamber management tree, the recipe window management tree and the parameter configuration table, the chamber management tree, the recipe window management tree and the parameter configuration table are created via a first graphical user interface (GUI).

13. The method of claim 9 further comprising a step of drawing the SPC chart according to the chart profile record and the parameter statistics record.

14. The method of claim 13 wherein, in the step of drawing the SPC chart, the SPC chart is selected via a second GUI.

15. The method of claim 10 further comprising a step of drawing the SPC chart according to the chart profile record and the parameter statistics record.

16. The method as in claim 15 wherein, in the step of drawing the SPC chart, the SPC chart is selected via a second GUI.

17. A machine-readable storage medium storing a computer program which, when executed, directs a computer to perform a method of automatic statistical process control (SPC) chart generation, comprising the steps of:
   acquiring a plurality of process events and a plurality of parameter values corresponding to the process events and a process parameter;
   selecting a statistical algorithm for the parameter values according to a chamber management tree, a recipe window management tree, a parameter configuration table, the process events and the process parameters, wherein the chamber management tree stores a relationship between at least two of tool type, processing tool and tool chamber, the recipe window management tree stores a relationship between at least two of tool type, recipe, and sampling window, and the parameter configuration table stores information indicating that the statistical algorithm is applied in the entire process, recipe or tool chamber for the process parameter;
   creating a new chart profile record and a first parameter statistics record linked to the new chart profile record if the chart profile record corresponding to the process events and the process parameter is absent; and
   storing the statistical values in the first parameter statistics record.

18. The machine-readable storage medium of claim 17 further comprising the steps of:
   creating a second parameter statistics record linked to the chart profile record if the chart profile record corresponding to the process events and the process parameters is present; and
   storing the statistical values in the second parameter statistics record.

19. The machine-readable storage medium of claim 17 further comprising a step of creating the chamber management tree, the recipe window management tree and the parameter configuration table.

20. The machine-readable storage medium of claim 19 wherein, in the step of creating the chamber management tree, the recipe window management tree and the parameter configuration table, the chamber management tree, the recipe window management tree and the parameter configuration table are created via a first graphical user interface (GUI).

21. The machine-readable storage medium of claim 17 further comprising a step of drawing the SPC chart according to the chart profile record and the parameter statistics record.

22. The machine-readable storage medium of claim 21 wherein, in the step of drawing the SPC chart, the SPC chart is selected via a second GUI.

23. The machine-readable storage medium of claim 18 further comprising a step of drawing the SPC chart according to the chart profile record and the parameter statistics record.

24. The machine-readable storage medium of claim 23 wherein, in the step of drawing the SPC chart, the SPC chart is selected via a second GUI.

* * * * *